US012662990B2

(12) United States Patent
Shi et al.

(10) Patent No.: US 12,662,990 B2
(45) Date of Patent: Jun. 23, 2026

(54) TRANSMISSION SYSTEM AND WIND TURBINE GENERATOR SYSTEM

(71) Applicant: BEIJING GOLDWIND SCIENCE & CREATION WINDPOWER EQUIPMENT CO., LTD., Beijing (CN)

(72) Inventors: Shengjie Shi, Beijing (CN); Yanhui Li, Beijing (CN); Mingwei Li, Beijing (CN)

(73) Assignee: BEJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/726,766

(22) PCT Filed: Sep. 27, 2022

(86) PCT No.: PCT/CN2022/121920
§ 371 (c)(1),
(2) Date: Jul. 3, 2024

(87) PCT Pub. No.: WO2024/000871
PCT Pub. Date: Jan. 4, 2024

(65) Prior Publication Data
US 2025/0067250 A1      Feb. 27, 2025

(30) Foreign Application Priority Data
Jun. 29, 2022    (CN) ......................... 202210750682.2

(51) Int. Cl.
F16H 57/025      (2012.01)
F03D 9/25      (2016.01)
(Continued)

(52) U.S. Cl.
CPC ........... *F03D 15/00* (2016.05); *F03D 80/703* (2023.08); *F16H 57/025* (2013.01); *F03D 9/25* (2016.05); *F16H 2057/02078* (2013.01)

(58) Field of Classification Search
CPC ............................................. F16H 2057/02078
See application file for complete search history.

(56) References Cited

U.S. PATENT DOCUMENTS

2010/0133854 A1    6/2010  Jansen et al.
2010/0329867 A1*  12/2010  Patel ....................... F03D 15/00
                                                               416/169 R
(Continued)

FOREIGN PATENT DOCUMENTS

CN          201199650 Y      2/2009
CN          201284799 Y      8/2009
(Continued)

OTHER PUBLICATIONS

USPTO Machine Translation (retrieved from FIT database) of the Description of CN 114183307 A1, Huang et al., Mar. 15, 2022. (Year: 2025).*

(Continued)

*Primary Examiner* — Daniel D Yabut

(57) ABSTRACT

The present application relates to discloses a transmission system and a wind turbine generator system, the transmission system includes: a gearbox, including a housing, an output shaft and a bearing, the output shaft being rotatably connected with the housing through the bearing; a generator, including a rotor, a stator and a packaging assembly, the stator being connected with the housing, the rotor being connected with the output shaft, and the packaging assembly including a cover, a first connecting member and a second connecting member, the cover is located on the same side of both the output shaft and the rotor, is connected and fixed with the rotor through the first connecting member, and is (Continued)

connected and fixed with the output shaft through the second connecting member; the cover is insulated from both the first connecting member and the rotor, and the cover is insulated from both the second connecting member and the output shaft. The transmission system and the wind turbine generator system provided by the embodiments of the present application can reduce the influence of the shaft voltage to the bearing and has a low cost.

12 Claims, 6 Drawing Sheets

(51) Int. Cl.
    *F03D 15/00* (2016.01)
    *F03D 80/70* (2016.01)
    *F16H 57/02* (2012.01)

(56) References Cited

U.S. PATENT DOCUMENTS

2017/0074249 A1    3/2017   Smook
2022/0341398 A1*  10/2022   Strasser ................ F16H 57/029

FOREIGN PATENT DOCUMENTS

| | | | | |
|---|---|---|---|---|
| CN | 101936265 | A | | 1/2011 |
| CN | 103883471 | A | | 6/2014 |
| CN | 101936265 | B | | 10/2014 |
| CN | 110829720 | A | | 2/2020 |
| CN | 211830419 | U | | 10/2020 |
| CN | 112049760 | A | | 12/2020 |
| CN | 213637303 | U | | 7/2021 |
| CN | 215452665 | U | | 1/2022 |
| CN | 114127447 | A | | 3/2022 |
| CN | 114183307 | A | | 3/2022 |
| CN | 216774512 | U | | 6/2022 |
| CN | 114785019 | A | | 7/2022 |
| CN | 116317285 | A | * | 6/2023 ............... F03D 9/25 |
| CN | 116357521 | A | * | 6/2023 ............... F03D 9/25 |
| DE | 202010003183 | U1 | | 7/2010 |
| EP | 2149702 | A2 | | 2/2010 |
| EP | 3795862 | A1 | * | 3/2021 ........... F16H 57/029 |
| KR | 20100080009 | A | | 7/2010 |

OTHER PUBLICATIONS

Chinese Notice of Patent Grant issued Nov. 22, 2023; Appln. No. 202210750682.2.
The International Search Report mailed Jan. 16, 2023: PCT/CN2022/121920.
The Extended European search report dated Apr. 23, 2025; Appln. No. 22948960.4.

* cited by examiner

C

1

TRANSMISSION SYSTEM AND WIND TURBINE GENERATOR SYSTEM

CROSS REFERENCE TO RELATED APPLICATIONS

The present application is a national stage of International Application No. PCT/CN2022/121920, filed Sep. 27, 2022, which claims priority to and the benefit of Chinese Patent Application No. 202210750682.2, filed Jun. 29, 2022, the entireties of which are hereby incorporated herein by reference.

TECHNICAL FIELD

The present application relates to the field of wind power technology, in particular to a transmission system and a wind turbine generator system.

BACKGROUND

The transmission system generally includes a gearbox and a generator, an output shaft of the gearbox can obtain kinetic energy, which is transmitted to a rotor of the generator through the output shaft after multi-level acceleration or deceleration, causing the rotor of the generator to rotate relative to its stator, and achieving conversion of kinetic energy to electrical energy. For example, in the field of wind power technology, the transmission system can obtain the kinetic energy of the impeller through a gearbox and transmit it to the generator after multi-level acceleration, achieving the conversion of kinetic energy to electrical energy.

In order to meet the transmission of kinetic energy, bearings are generally installed between the output shaft and a casing of the gearbox. During operation of the generator, a shaft voltage may be generated due to various reasons, which can damage the bearings. During operation, there a lubricating oil film between an inner ring, a rolling element, and an outer ring of the bearing, which plays a certain insulation role and can protect the bearing from being damaged by a relatively low shaft voltage. However, when the shaft voltage exceeds a withstand voltage value of the oil film, the oil film will be broken down and electrical discharge may occur. Due to the small contact areas between the rolling element of the bearing and the inner and outer rings, high temperature may be instantly generated at the contact positions, causing local melting of the bearing.

Therefore, in order to protect the bearings, it is necessary to block the path of shaft voltage flowing through the bearings. The existing blocking manner generally use insulated bearings, which are generally made of ceramic materials. For transmission systems, using insulated bearings will keep their costs high and make them have lower market competitiveness.

SUMMARY

Embodiments of the present application provide a transmission system and a wind turbine generator system, and the transmission system can reduce the influence of the shaft voltage to the bearing and has a low cost.

On one aspect, the embodiments of the present application provide a transmission system, which includes: a gearbox, including a housing, an output shaft and a bearing, the output shaft being rotatably connected with the housing through the bearing; a generator, including a rotor, a stator and a packaging assembly, the stator being connected with the housing, the rotor being connected with the output shaft, and the packaging assembly including a cover, a first connecting member and a second connecting member, the cover is located on the same side of both the output shaft and the rotor, is connected and fixed with the rotor through the first connecting member, and is connected and fixed with the output shaft through the second connecting member; the cover is insulated from both the first connecting member and the rotor, and the cover is insulated from both the second connecting member and the output shaft.

On another aspect, the embodiments of the present application provide a wind turbine generator system, which includes the above-mentioned transmission system.

According to the transmission system and the wind turbine generator system provided by the embodiments of the present application, the transmission system includes a gearbox and a generator, the gearbox includes a housing, an output shaft and a bearing, the output shaft is rotatably connected with the housing through the bearing, the generator includes a rotor, a stator and a packaging assembly, and the cover is connected and fixed with the rotor through the first connecting member, and is connected and fixed with the output shaft through the second connecting member; the cover can protect the internal structures of the generator and transmit the kinetic energy of the output shaft to the rotator, so as to drive the rotor to rotate relative to the stator, and meet power generation requirements. Since the cover is insulated from the first connecting member and the rotor, and is insulated from the second connecting member and the output shaft, the current transmission and conduction between the rotor and the shaft can be blocked at the positions of both the first connecting member and the second connecting member, thereby effectively avoiding damage to the bearing caused by the shaft voltage; moreover, by this manner, the bearing does not need to be an insulated bearing, and the cost is low.

DESCRIPTION OF THE DRAWINGS

The features, advantages, and technical effects of the exemplary embodiments of the present application will be described below with reference to the accompanying drawings.

AMONG THEM

Figure 1:
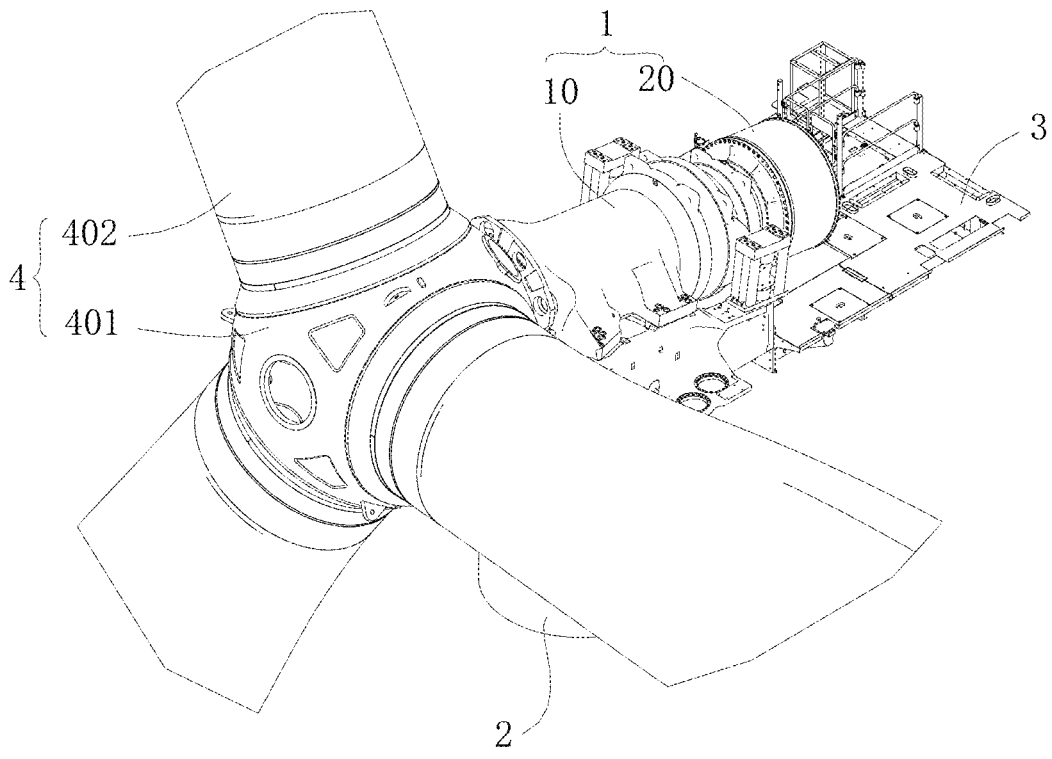
FIG. 1 is a structural schematic diagram of a wind turbine generator system in one embodiment of the present application.

1—transmission system;
10—gearbox; 11—housing; 12—output shaft; 121—fourth through-hole; 13—bearing; 14—box cover; 141—groove;
20—generator;
21—rotor;
22—packaging assembly; 211—second through-hole;
221—cover; 2211—protrusion; 2212—first through-hole; 2213—third through-hole; 222—first connecting member; 2221—first connecting rod; 2222—first end cap;

223—second connecting member; 2231—second connecting rod; 2232—second end cap;
224—first insulating member; 2241—first insulating sleeve; 2242—first inner insulating part; 2242a—first inner insulating ring; 2242b—first inner positioning ring; 2243—first outer insulating part;
225—first force-equalizing ring;
226—second insulating member; 2261—second insulating sleeve; 2262—second inner insulating part; 2262a—second inner insulating ring; 2262b—second inner positioning ring; 2263—second outer insulating part;
227—second force-equalizing ring;
228—first gasket;
229—second gasket;
2—tower; 3—nacelle; 4—impeller; 401—hub; 402—blade;
X-axial direction; Y-radial direction.

In the accompanying drawings, the same reference numerals are used for the same components. The accompanying drawings are not drawn to actual scale.

DETAILED DESCRIPTION

The features and exemplary embodiments of various aspects of the present application will be described in detail below. In the following detailed description, many specific details are proposed in order to provide a comprehensive understanding of the present application. However, it is obvious to those skilled in the art that the present application may be implemented without some of these specific details. The following description of the embodiments is only to provide a better understanding of the present application by showing examples of the present application. In the accompanying drawings and the following description, at least part of the well-known structures and technologies are not shown in order to avoid unnecessary blurring of the present application; and, for clarity, the sizes of some structures may be exaggerated. Furthermore, the features, structures or characteristics described hereinafter may be combined in any suitable manner in one or more embodiments.

The directional terms appearing in the following description are all directions shown in the drawings, and are not intended to limit specific structures of a transmission system and a wind turbine generator system of the present application. In the description of the present application, it should also be noted that, unless otherwise clearly specified and defined, the terms "installed" and "connected" should be generally understood, for example, the "connected" may be fixedly connected, detachably connected, integrally connected, directly connected, or indirectly connected. Those skilled in the art could understand the specific meanings of the above terms in the present application according to specific circumstances.

Please refer to FIG. 1, the embodiments of the present application provide a wind turbine generator system, which includes a tower 2, a nacelle 3, a transmission system 1, and an impeller 4; the tower 2 is connected to a turbine foundation, the nacelle 3 is disposed at a top of the tower 2, and the nacelle 3 includes a base and can be connected with the tower 2 through the base; the impeller 4 includes a hub 401 and blades 402, the transmission system 1 is disposed in the nacelle 3, and the impeller 4 is connected with the transmission system 1; when wind energy acts on the blades 402, the blades 402 drives the hub 401 to rotate and transfer the wind energy to kinetic energy, which is transmitted to the transmission system 1, and the transmission system 1 converts the kinetic energy into electrical energy for storage.

Please refer to FIGS. 1 to 5, the embodiments of the present application further provide a transmission system 1, which includes a gearbox 10 and a generator 20; the gearbox 10 includes a housing 11, an output shaft 12 and a bearing 13, and the output shaft 12 is rotatably connected with the housing 11 through the bearing 13. The generator 20 includes a rotor 21, a stator (not shown in the Figure) and a packaging assembly 22, the stator is connected with the housing 11, and the rotor 21 is connected with the output shaft 12; the packaging assembly 22 includes a cover 221, a first connecting member 222 and a second connecting member 223, the cover 221 is located on the same side of both the output shaft 12 and the rotor 21, is connected and fixed with the rotor 21 through the first connecting member 222, and is connected and fixed with the output shaft 12 through the second connecting member 223. The cover 221 is insulated from both the first connecting member 222 and the rotor 21, and the cover 221 is insulated from both the second connecting member 223 and the output shaft 12.

Optionally, the gearbox 10 can further include a gear train and an input shaft, the input shaft is connected with the impeller 4, the impeller 4 converts wind energy into rotational kinetic energy and inputs it to the input shaft, and the rotational kinetic energy is transmitted to the output shaft 12 after acceleration through the gear train; since the output shaft 12 is connected with the rotor 21, and is rotatably connected with the housing 11 through the bearing 13, the output shaft 12 can drive the rotor 21 to rotate relative to the stator to convert the wind energy into electrical energy.

Optionally, the rotor 21 can be located outside the stator, that is, the generator 20 can be in a form of an external rotor. Certainly, the rotor 21 can be located inside the stator, that is, the generator 20 is in a form of an internal rotor. The present embodiment is illustrated in the figures by taking the internal rotor as an example.

Optionally, the first connecting member 222 and the second connecting member 223 themselves can adopt structural forms of insulating members; certainly, the first connecting member 222 and the second connecting member 223 themselves can be conductor structures, and meet the insulation requirements from the cover 221 through insulating materials matching with them.

Optionally, the first connecting member 222 can extend into interiors of both the cover 221 and the rotor 21, and connect and fix the cover 221 with the rotor 21.

Optionally, the second connecting member 223 can extend into interiors of both the cover 221 and the output shaft 12, and connect and fix the cover 221 with the output shaft 12.

Due to various reasons, shaft voltage may be generated during operation of the generator 20, which can cause damage to the bearing 13. During operation of the bearing 13, there is a lubricating oil film among an inner ring, a rolling element and an outer ring, which plays a certain insulation role and can protect the bearing 13 from damage from a relatively low shaft voltage; however, when the shaft voltage exceeds a withstand voltage value of the oil film, the oil film will be broken down and electric discharge will occur. Due to the small contact areas between the rolling element of the bearing 13 and the inner and outer rings, high temperature can be instantly generated at the contact positions, causing local melting of the bearing 13.

In order to reduce the damage to the bearing 13 caused by the shaft voltage, in the existing transmission system 1, an insulated bearing is generally selected for the bearing 13; the insulated bearing is generally made of ceramic material, and due to use of the insulated bearing, a high cost is remained for the transmission system 1 and its market competitiveness is low.

While in the transmission system 1 provided in the embodiments of the present application, the cover 221 is insulated from both the first connecting member 222 and the rotor 21, and also is insulated from both the second connecting member 223 and the output shaft 12, and by the above configuration, it can block the current transmission conduction between the rotor 21 and the rotating shaft at the positions of both the first connecting member 222 and the second connecting member 223, thereby effectively avoiding the shaft voltage from damaging the bearing 13; moreover, by such manner, there is no need to use the insulated bearing for the bearing 13, and the bearing 13 can be made of conventional materials such as metals, thereby effectively reducing costs.

As an optional implementation, in the transmission system 1 provided in the embodiments of the present application, the packaging assembly 22 further includes a first insulating member 224, the first connecting member 222 is inserted into and connected with both the cover 221 and the rotor 21, and the cover 221 is insulated from both the first connecting member 222 and the rotor 21 through the first insulating member 224.

Optionally, the first insulating member 224 can be formed as an integrated structure, and certainly, it can also be a split structure, which may include multiple split components made of insulating materials.

Optionally, when the packaging assembly 22 includes the first insulating member 224, the first connecting member 222 can be constructed of a metal conductor with high strength, low cost and high connection strength.

Optionally, along an axial direction X of the output shaft 12, the cover 221 can be provided with a first through-hole 2212, the rotor 21 can be provided with a second through-hole 211, the first connecting member 222 extends into the first through-hole 2212 as well as the second through-hole 211, and the first insulating member 224 can be disposed between the cover 221 and the first connecting member 222 so as to insulate the first connecting member 222 from the cover 221.

In the transmission system 1 provided in the embodiments of the present application, by including the first insulating member 224, the packaging assembly 22 can enable insulation of the first connecting member 222 from the cover 221 through the first insulating member 224 when connecting the cover 221 with the rotor 21 by the first connecting member 222, so that the shaft voltage between the rotor 21 and the output shaft 12 is prevented from being transmitted through the cover 221 and forming a path, thereby effectively avoiding the damage of the shaft voltage to the bearing 13. Moreover, due to the providing of the first insulating member 224, there is no need for the first connecting member 222 to be made of insulating materials, and the first connecting member 222 can be constructed of a metal conductor with high strength, convenient procurement and low cost, which can not only ensure the connection strength between the cover 221 and the rotor 21, but also can reduce the cost of the transmission system.

In some optional embodiments, the first insulating member 224 includes a first insulating sleeve 2241, a first inner insulating part 2242, and a first outer insulating part 2243, the cover 221 is insulated from the rotor 21 through the first inner insulating part 2242, and the first connecting member 222 is insulated from the cover 221 through both the first insulating sleeve 2241 and the first outer insulating part 2243.

Optionally, the first insulating sleeve 2241, the first inner insulating part 2242, and the first outer insulating part 2243 can be formed as an integrated structure, or can be a split structure which is conducive to processing and assembly.

Optionally, the first insulating sleeve 2241 can be located in the first through-hole 2212 and disposed surrounding the first connecting member 222. By means of the first insulating sleeve 2241, a wall of the cover 221 for enclosing and forming the first through-hole 2212 is insulated from the first connecting member 222.

Optionally, in the axial direction X of the output shaft 12, the first inner insulating part 2242 is at least partially clamped between the cover 221 and the rotor 21, so as to insulate the cover 221 from the rotor 21.

Optionally, in the axial direction X of the output shaft 12, the first outer insulating part 2243 is at least partially clamped between the cover 221 and the first connecting member 222, so that an end face of the cover 221 in the axial direction X is insulated from the first connecting member 222.

In the transmission system 1 provided in the embodiments of the present application, by providing the first insulating member 224 to include the first insulating sleeve 2241, the first inner insulating part 2242 and the first outer insulating part 2243, the rotor 21 can be insulated from the cover 221 through the first inner insulating part 2242, and the first connecting member 222 can be insulated from the cover 221 through the first insulating sleeve 2241 and the first outer insulating part 2243, thereby blocking the transmission of the shaft voltage between the rotor 21 and the output shaft 12, and ensuring the safety of the bearing 13.

In some optional embodiments, the first connecting member 222 includes a first connecting rod 2221 and a first end cap 2222, the first connecting rod 2221 is inserted into and connected with both the cover 221 and the rotor 21 and is threadedly connected with the rotor 21, the first end cap 2222 is disposed at one end of the first connecting rod 2221 away from the rotor 21 in the axial direction X, the first insulating sleeve 2241 is sleeved on the first connecting rod 2221, the first inner insulating part 2242 is clamped between the cover 221 and the rotor 21, and the first outer insulating part 2243 is clamped between the first end cap 2222 and the cover 221.

Optionally, the first connecting rod 2221 can extend along the axial direction X of the output shaft 12. Optionally, an axis of the first connecting rod 2221 is spaced apart from and parallel to the axis of the output shaft 12.

Optionally, a radial size of the first end cap 2222 is greater than that of the first connecting rod 2221.

Optionally, the first connecting member 222 can include at least one of bolts and screws, and can be a standard part made of metal materials.

Optionally, the first connecting rod 2221 can be inserted into and connected with the second through-hole 211 of the rotor 21, an inner wall of the second through-hole 211 can be provided with internal threads, and the first connecting rod 2221 extends into the second through-hole 211 and is threadedly connected with the rotor 21.

Optionally, the first insulating sleeve 2241 is sleeved on the periphery of the first connecting rod 2221, and on a radial direction Y of the output shaft 12, the first insulating sleeve 2241 can be clamped between the first connecting rod 2221 and the wall of the cover 221 for enclosing and forming the first through-hole 2212.

Optionally, the first inner insulating part 2242 can be an annular structure and clamped between the cover 221 and the rotor 21. The first inner insulating part 2242 can be provided with a perforating hole, so that the first connecting rod 2221 of the first connecting member 222 can pass through the first inner insulating part 2242 and extend into the rotor 21.

Optionally, the first outer insulating part 2243 can be an annular structure and clamped between the cover 221 and the first end cap 2222. The first outer insulating part 2243 can be provided with a perforating hole, so that the first connecting rod 2221 of the first connecting member 222 can pass through the first outer insulating part 2243 and be connected with the first end cap 2222.

The transmission system 1 provided in the embodiment of the present application provides the first insulating member 224 to include the first insulating sleeve 2241, the first inner insulating part 2242 and the first outer insulating part 2243, and defines the matching relation between the various parts and the rotor 21, the cover 221 and the first connecting member 222, which facilitates the forming and assembly of the first insulating member 224, and can effectively block the transmission path of the shaft voltage between the rotor 21 and the output shaft 12, thereby ensuring the safety of the bearing 13.

Meanwhile, the first connecting member 222 adopts the form of the first connecting rod 2221 combining with the first end cap 2222, and the first connecting rod 2221 is connected and fixed with the rotor 21 by means of threaded connection; thus, on the basis of meeting the insulation requirements, the stable connection between the cover 221 and the rotor 21 through the first connecting member 222 can be ensured, thereby facilitating the transmission of power between the output shaft 12 and the rotor 21.

In some optional embodiments, in the transmission system 1 provided in the present application embodiment, the packaging assembly 22 further includes a first force-equalizing ring 225, which is clamped between the first outer insulating part 2243 and the first end cap 2222.

Optionally, the first force-equalizing ring 225 can be provided with a perforating hole, and the first connecting rod 2221 of the first connecting member 222 can pass through the first force-equalizing ring 225.

Optionally, the first force-equalizing ring 225 can be a rigid component, and optionally can be a metal annular structure.

Due to the fact that the first outer insulating part 2243 is made of insulating material, its wear resistance and load-bearing capacity are relatively weak. By providing the first force-equalizing ring 225 and clamping it between the first outer insulating part 2243 and the first end cap 2222, a force in the axial direction X applied on the first end cap 2222 can be evenly distributed on the first outer insulating part 2243 through the first force-equalizing ring 225, thereby reducing the pressure bore by the first outer insulating part 2243 on each unit surface. The wear of the first outer insulating part 2243 due to excessive local pressure is avoided, the insulation effect is ensured, and thus the safety performance of the bearing 13 is ensured.

In some optional embodiments, the packaging assembly 22 may further include a first gasket 228, which is clamped between the first end cap 2222 and the first force-equalizing ring 225. By providing the first gasket 228, it can ensure the pre-tightening force between the cover 221 and the rotor 21 applied by the first end cap 2222 in the axial direction X of the output shaft 12, thereby ensuring the transmission of kinetic energy between the output shaft 12 and the rotor 21 through the cover 221.

Figure 4:
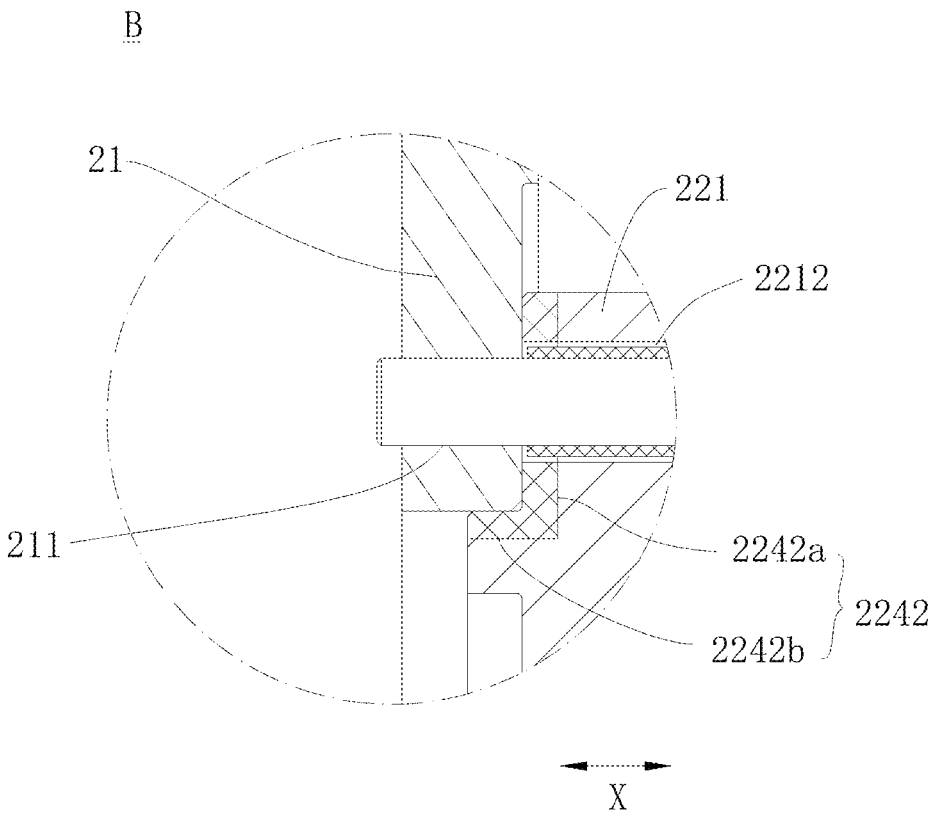
FIG. 4 is an enlarged view of position B in FIG. 3.
Figure 5:
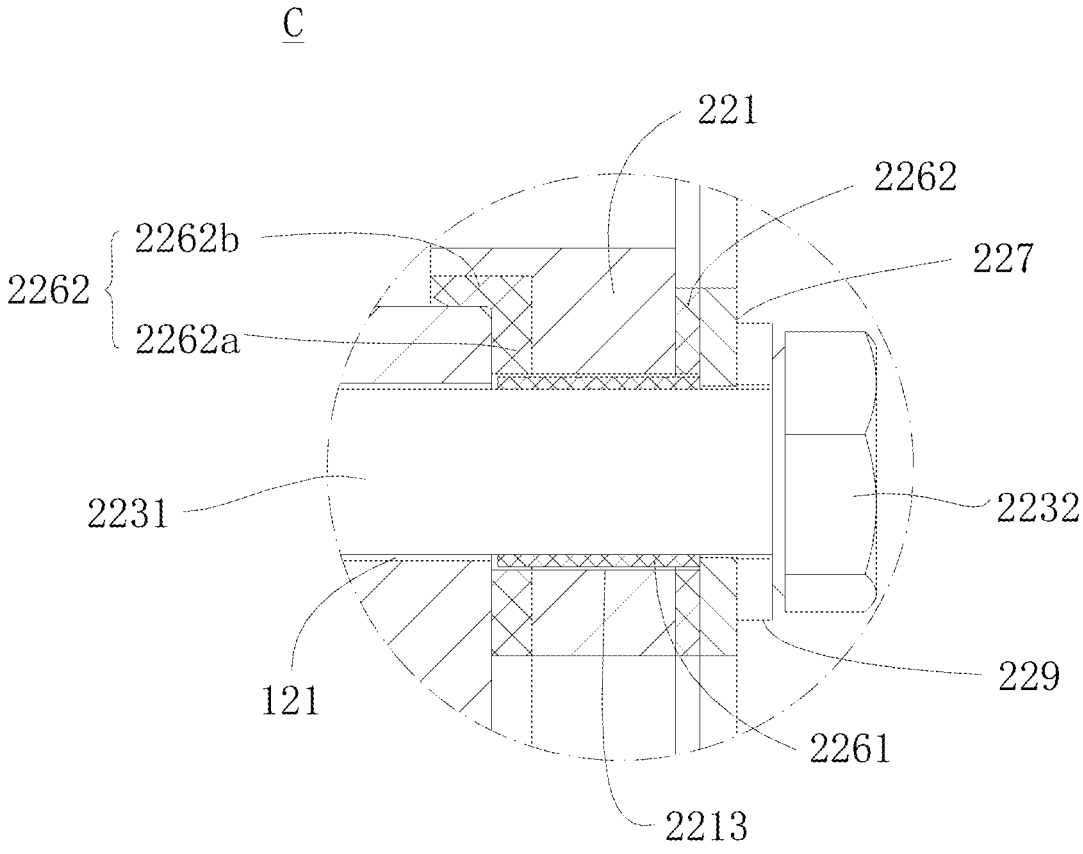
FIG. 5 is an enlarged view of position C in FIG. 3.

As shown in FIG. 4, as some optional implementations, the first inner insulating part 2242 includes a first inner insulating ring 2242*a* and a first inner positioning ring 2242*b*, the first inner insulating ring 2242*a* is clamped between the rotor 21 and the cover 221, and the first inner positioning ring 2242*b* is inserted into and connected with the rotor 21.

Optionally, the first inner insulating ring 2242*a* and the first inner positioning ring 2242*b* can be arranged coaxially and formed as an integrated structure.

Optionally, the first inner insulating ring 2242*a* and the first inner positioning ring 2242*b* can be sequentially arranged along the axial direction X of the output shaft 12.

In the transmission system 1 provided in the embodiments of the present application, by providing the first inner insulating part 2242 to include the first inner insulating ring 2242*a* and the first inner positioning ring 2242*b*, clamping the first inner insulating ring 2242*a* between the rotor 21 and the cover 221, and inserting the first inner positioning ring 2242*b* into the rotor 21 and connecting them, the insulation requirements between the cover 221 and the rotor 21 can be met, and meanwhile, when the first inner insulating ring 2242*a* is assembled, the positioning between it and the rotor 21 can be facilitated, thereby ensuring the assembly accuracy.

In some optional embodiments, the transmission system 1 provided in the present application embodiment may include two or more first connecting members 222, and in this case, the two or more first connecting members 222 are spaced apart from each other in a circumferential direction of the output shaft 12, optionally spaced apart and evenly distributed, and the cover 221 is insulated from each first connecting member 222.

As an optional implementation, in the transmission system 1 provided in the embodiments of the present application, the packaging assembly 22 further includes a second insulating member 226, the second connecting member 223 is inserted into and connected with both the cover 221 and the output shaft 12, and the cover 221 is insulated from both the second connecting member 223 and the output shaft 12 through the second insulating member 226.

Optionally, the second insulating member 226 can be formed as an integrated structure, or a split structure which may include multiple split components made of insulating materials.

Optionally, when the packaging assembly 22 includes the second insulating member 226, the second connecting member 223 may be constructed of a metal conductor with high strength, low cost and high connection strength.

Optionally, along the axial direction X of the output shaft 12, a third through-hole 2213 can be provided in the cover 221, a fourth through-hole 121 can be provided in the output shaft 12, and the second connecting member 223 extends into the third through-hole 2213 as well as the fourth through-hole 121, and the second insulating member 226 can be disposed between the cover 221 and the second connecting member 223 to insulate the second connecting member 223 from the cover 221.

In the transmission system 1 provided in the embodiments of the present application, by including the second insulating member 226, the packaging assembly 22 enables the second connecting member 223 to be insulated from the cover 221 through the second insulating member 226 when connecting the cover 221 and the output shaft 12 by the second connecting member 223, so that the shaft voltage between the rotor 21 and the output shaft 12 cannot be transmitted through the cover 221 to form a path, thereby effectively avoiding damage to the bearing 13 caused by the shaft voltage. Moreover, due to providing of the second insulating member 226, there is no need for the second connecting member 223 to be made of insulating materials, and the second connecting member 223 can be constructed of a metal conductor with high strength, convenient procurement and low cost, which not only can ensure the connection strength between the cover 221 and the output shaft 12, but also can reduce the cost of the transmission system.

As shown in FIGS. 2 to 5, as an optional implementation, the second insulating member 226 includes a second insulating sleeve 2261, a second inner insulating part 2262, and a second outer insulating part 2263, the cover 221 is insulated from the output shaft 12 through the second inner insulating part 2262, and the second connecting member 223 is insulated from the cover 221 through both the second insulating sleeve 2261 and the second outer insulating part 2263.

Optionally, the second insulating sleeve 2261, the second inner insulating part 2262, and the second outer insulating part 2263 can be formed as an integrated structure, or a split structure which is conducive to processing and assembly.

Optionally, the second insulating sleeve 2261 can be located in the third through-hole 2213 and disposed surrounding the second connecting member 223. Through the second insulating sleeve 2261, a wall of the cover 221 for enclosing and forming the third through-hole 2213 is insulated from the second connecting member 223.

Optionally, in the axial direction X of the output shaft 12, the second inner insulating part 2262 is at least partially clamped between the cover 221 and the output shaft 12, so that the insulation is set between the cover 221 and the rotor 21.

Optionally, in the axial direction X of the output shaft 12, the second outer insulating part 2263 is at least partially clamped between the cover 221 and the second connecting member 223, so that the end face of the cover 221 in the axial direction X is insulated from the second connecting member 223.

In the transmission system 1 provided in the embodiments of the present application, by providing the second insulating member 226 to include the second insulating sleeve 2261, the second inner insulating part 2262 and the second outer insulating part 2263, the output shaft 12 can be insulated from the cover 221 by the second inner insulating part 2262, and the second connecting member 223 can be insulated from the cover 221 by both the second insulating sleeve 2261 and the second outer insulating part 2263, thereby blocking transmission of the shaft voltage between the rotor 21 and the output shaft 12, and ensuring the safety of the bearing 13.

As an optional implementation, the second connecting member 223 includes a second connecting rod 2231 and a second end cap 2232, the second connecting rod 2231 is inserted into and connected with both the cover 221 and the output shaft 12 along the axial direction X and is threadedly connected with the output shaft 12, the second end cap 2232 is disposed at one end of the second connecting rod 2231 away from the output shaft 12 in the axial direction X, the second insulating sleeve 2261 is sleeved on the second connecting rod 2231, the second inner insulating part 2262 is clamped between the cover 221 and the output shaft 12, and the second outer insulating part 2263 is clamped between the second end cap 2232 and the cover 221.

Optionally, the second connecting rod 2231 can extend along the axial direction X of the output shaft 12. Optionally, an axis of the second connecting rod 2231 is spaced apart from and parallel to the axis of the output shaft 12.

Optionally, a radial size of the second end cap 2232 is greater than that of the second connecting rod 2231.

Optionally, the second connecting member 223 can include at least one of bolts or screws, and can be made of a standard part made of metal materials.

Optionally, the second connecting rod 2231 can be inserted into the fourth through-hole 121 of the output shaft 12, an inner wall of the fourth through-hole 121 can be provided with internal threads, and the second connecting rod 2231 extends into the fourth through-hole 121 and is threadedly connected with the output shaft 12.

Optionally, the second insulating sleeve 2261 is sleeved on the periphery of the second connecting rod 2231, and on the radial direction Y of the output shaft 12, the second insulating sleeve 2261 can be clamped between the second connecting rod 2231 and the wall of the cover 221 for enclosing and forming the third through-hole 2213.

Optionally, the second inner insulating part 2262 can be in an annular structure and clamped between the cover 221 and the output shaft 12. The second inner insulating part 2262 can be provided with a perforating hole, so that the second connecting rod 2231 of the second connecting member 223 can pass through the second inner insulating part 2262 and extend into the rotor 21.

Optionally, the second outer insulating part 2263 can be in an annular structure and clamped between the cover 221 and the second end cap 2232. The second outer insulating part 2263 can be provided with a perforating hole, so that the second connecting rod 2231 of the second connecting member 223 can pass through the second outer insulating part 2263 and be connected with the second end cap 2232.

In the transmission system 1 provided in the embodiments of the present application, by providing the second insulating member 226 to include the second insulating sleeve 2261, the second inner insulating part 2262, and the second outer insulating part 2263, and defining the matching relation between the various parts and the output shaft 12, the cover 221 and the second connecting member 223, the forming and assembly of the second insulating member 226 are facilitated, and the transmission path of the shaft voltage between the rotor 21 and the output shaft 12 can be effectively blocked, thereby ensuring the safety of the bearing 13. Meanwhile, since the second connecting member 223 adopts the form of the second connecting rod 2231 combining with the second end cap 2232, and the second connecting rod 2231 is connected and fixed with the output shaft 12 by means of threaded connection, on the basis of meeting the insulation requirements, the stable connection between the cover 221 and the rotor 21 through the second connecting member 223 can be ensured, thereby facilitating the transmission of power between the output shaft 12 and the rotor 21.

In some optional embodiments, the packaging assembly 22 further includes a second force-equalizing ring 227, which is clamped between the second outer insulating part 2263 and the second end cap 2232.

Optionally, the second force-equalizing ring 227 can be provided with a perforating hole, and the second connecting rod 2231 of the second connecting member 223 can pass through the second force-equalizing ring 227.

Optionally, the second force-equalizing ring 227 can be a rigid component, and optionally can be a metal annular structure.

Due to the fact that the second outer insulating part 2263 is made of insulating material, its wear resistance and load-bearing capacity are relatively weak. By providing the second force-equalizing ring 227 and clamping it between the second outer insulating part 2263 and the second end cap 2232, a force in the axial direction X applied by the second end cap 2232 can be evenly distributed on the second outer insulating part 2263 through the second force-equalizing ring 227, reducing the pressure bore by the second outer insulating part 2263 on each unit surface. The wear of the second outer insulating part 2263 due to excessive local pressure can be avoided, the insulation effect is ensured, and thus the safety performance of the bearing 13 is ensured.

In some optional embodiments, the packaging assembly 22 may further include a second gasket 229, which is clamped between the second end cap 2232 and the second force-equalizing ring 227. By providing the second gasket 229, it can ensure the pre-tightening force between the cover 221 and the output shaft 12 in the axial direction X of the output shaft 12 applied by the second end cap 2232, thereby ensuring the transmission of kinetic energy between the output shaft 12 and the rotor 21 through the cover 221.

In some optional embodiments, the second inner insulating part 2262 includes a second inner insulating ring 2262a and a second inner positioning ring 2262b, the second inner insulating ring 2262a is clamped between the output shaft 12 and the cover 221, and the second inner positioning ring 2262b is sleeved on one end of the output shaft 12.

Optionally, the second inner insulating ring 2262a and the second inner positioning ring 2262b can be arranged coaxially and formed as an integrated structure.

Optionally, the second inner insulating ring 2262a and the second inner positioning ring 2262b can be sequentially arranged along the axial direction X of the output shaft 12.

In the transmission system 1 provided in the embodiments of the present application, by providing the second inner insulating part 2262 to include the second inner insulating ring 2262a and the second inner positioning ring 2262b, clamping the second inner insulating ring 2262a between the output shaft 12 and the cover 221, and sleeving the second inner positioning ring 2262b on the output shaft 12, the insulation requirements between the cover 221 and the output shaft 12 can be met, and meanwhile, when the second inner insulating ring 2262a is assembled, the positioning between it and the output shaft 12 is facilitated, thereby ensuring the assembly accuracy.

Optionally, the first insulating sleeve 2241 and the second insulating sleeve 2261 can be made of epoxy resin glass fiber cloth by laminating or winding process, or made of rubber or other materials, and the main function thereof is to isolate the first connecting member 222 and the second connecting member 223, preventing the first connecting member 222 and the second connecting member 223 from coming into contact with metal parts and generating circuit conduction.

Optionally, the first outer insulating part 2243 and the second outer insulating part 2263 are formed in an annular thin plate structure, which can be made of a laminated plate of epoxy resin glass fiber cloth, or made of rubber or other materials, the main function thereof is to isolate the cover 221 and prevent it from coming into contact with the first connecting member 222, the second connecting member 223, the first gasket 228, the second gasket 229, etc., thereby blocking a circuit, and meanwhile, to form friction pairs between the first force-equalizing ring 225 and the cover 221, thereby transmitting the tightening torque generated by the first connecting member 222 and the second connecting member 223.

In some optional embodiments, the transmission system 1 provided in the present application embodiment may include two or more second connecting members 223, and in this case, the two or more second connecting members 223 are spaced apart from each other in the circumferential direction of the output shaft 12, optionally spaced apart from each other and evenly distributed, and the cover 221 is insulated from each second connecting member 223.

Figure 2:
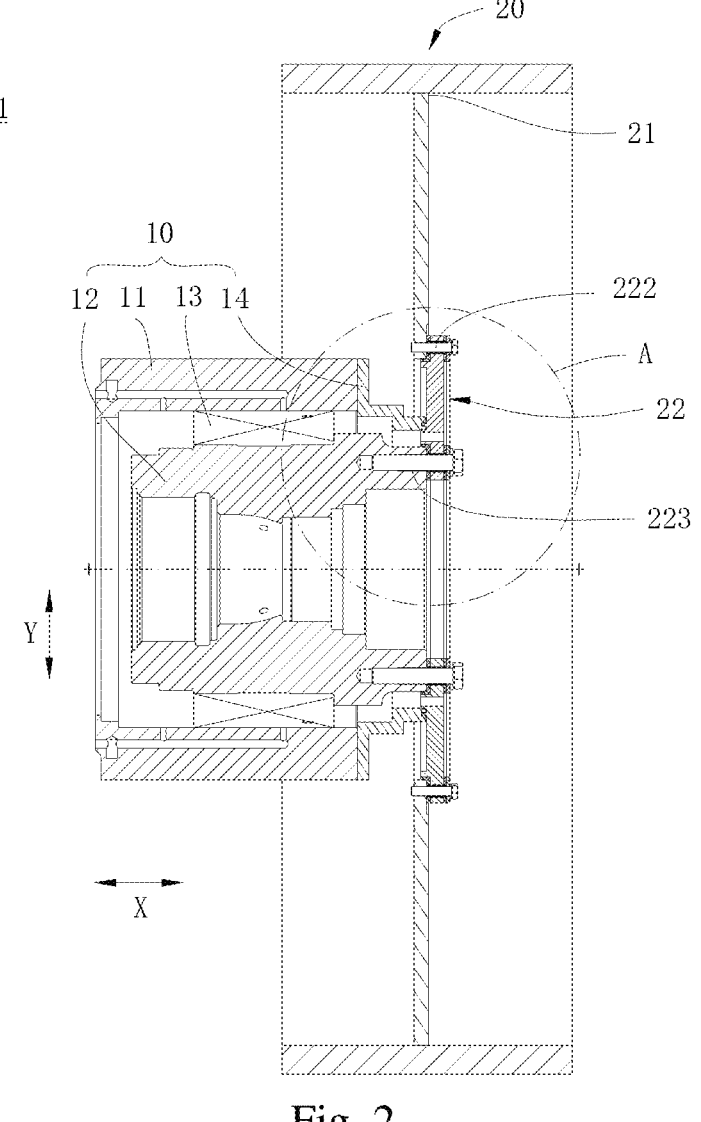
FIG. 2 is a cross-sectional schematic diagram of a transmission system in one embodiment of the present application.
Figure 3:
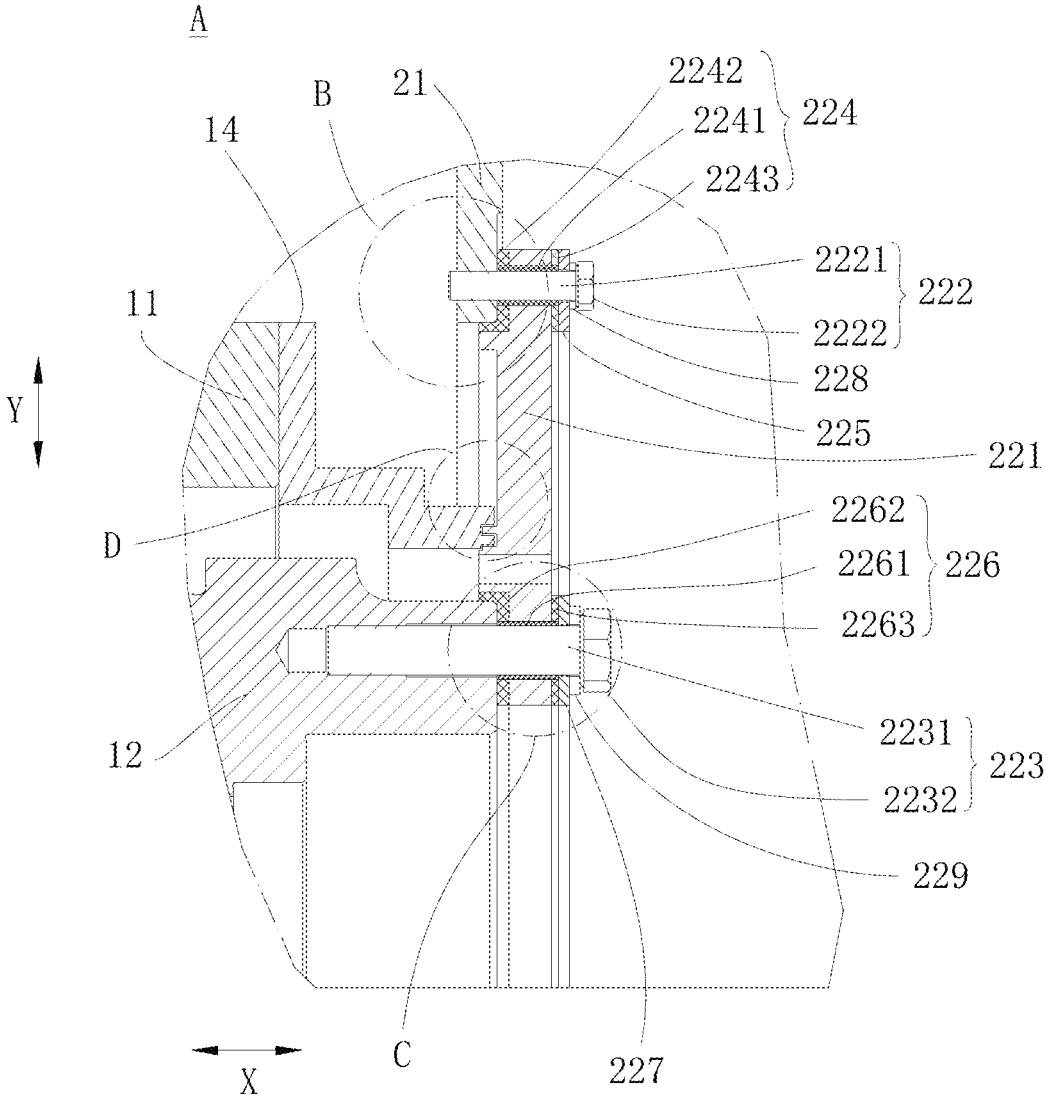
FIG. 3 is an enlarged view of position A in FIG. 2.
Figure 6:
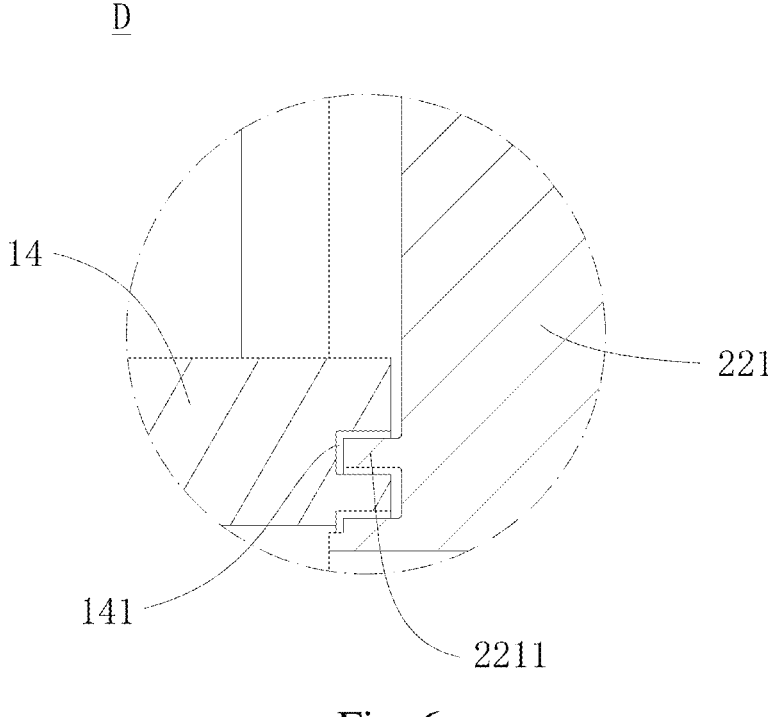
FIG. 6 is an enlarged view of position D in FIG. 3.

Please refer to FIGS. 2 and 6, in some optional embodiments, the gearbox 10 further includes a box cover 14, which is arranged at one end of the housing 11 in the axial direction X and clamped between the housing 11 and the cover 221, where one of the box cover 14 and the packaging assembly 22 is provided with a protrusion 2211, and the other one is provided with a groove 141, the protrusion 2211 extends into the groove 141 and is matched with the groove 141 in a dynamical sealing manner.

Optionally, a plurality of protrusions 2211 can be provided on the cover 221, and meanwhile, a plurality of grooves 141 can be provided in the box cover 14, the shape of the grooves 141 matches that of the protrusions 2211, and the protrusions 2211 extend into the grooves 141 and match with the grooves 141 in the dynamical sealing manner, thereby forming a labyrinth seal between the box cover 14 and the cover 221, and ensuring the sealing effect.

When the generator 20 operates, the bearing 13 is installed in the gearbox 10 to support rotation of the output shaft 12. Lubricating oil may overflow from the bearing 13 and, after passing through the internal sealing structure, may still leak to the position of the box cover 14 on the outer side. In the transmission system 1 provided in the embodiments of the present application, by directly providing one of the grooves 141 and protrusions 2211 on the cover 221 and providing the other one on the box cover 14, the cover 221 and the box cover 14 can be directly sealed and matched with each other, thereby ensuring the sealing requirements between them, avoiding the leaking of the lubricating oil, and eliminating the need of additional independent sealing components, which is conducive to simplifying the structure of the transmission system 1, and saving processing and installation costs.

In the transmission system 1 provided in the embodiments of the present application, when the packaging assembly 22 is installed, the box cover 14 of the gearbox 10 is connected with the housing 11 through bolts at first. Then, the first inner insulating part 2242 of the first insulating member 224 is installed onto the cover 221, the first insulating sleeve 2241 is inserted, the first outer insulating part 2243 and the first force-equalizing ring 225 are aligned sequentially, the first gasket 228 and the first connecting member 222 are inserted, and the cover 221 and the rotor 21 are fastened together. Finally, the second inner insulating part 2262 of the second insulating member 226 is installed to the cover 221, the installation holes of the cover 221 and the output shaft 12 are aligned, the second insulating sleeve 2261 is inserted, the second outer insulating part 2263 and the second force-equalizing ring 227 are aligned sequentially, the second gasket 229 and the second connecting member 223 are inserted, and the cover 221 and the output shaft 12 are fastened.

The transmission system 1 provided in the embodiments of the present application can meet the requirements of blocking the shaft voltage, transmitting torque, and sealing the bearing 13 at the same time. From the perspective of part quantity, the number of parts is small and the structural form is simple; as a result, the assembly process is simple, the assembly difficulty is reduced, the manufacturing cycle is shorted, and the assembly cost is lowered. From the perspective of processing and manufacturing of parts, all involved parts can be manufactured by conventional materials and processes, and the materials belong to pipes and plates, which can reduce material and processing costs. From the perspective of load transfer efficiency, the friction pair structure has higher load transfer performance, and the stress on the parts is more uniform, which greatly increases the service life of the product, thereby reducing the amplitude of stress changes and reducing later operation and maintenance costs. Based on the above points, the above structure has an advantage in cost.

The wind turbine generator system provided in the embodiments of the present application includes the transmission system 1 provided in the various embodiments as mentioned above, can not only ensure the conversion demand from wind energy to electrical energy, but also can avoid the breakdown damage to the bearing 13 caused by the shaft voltage, thereby improving the power generation efficiency of the wind turbine generator system. It can be understood that it is only an optional implementation for the transmission system 1 provided in the embodiments of the present application to be applied in the wind turbine generator system, and it can also be used in the field that converts other kinds of energy to electrical energy, such as tidal energy conversion equipment.

Although the present application is described with reference to the preferred embodiments, various improvements can be made and equivalents can be substituted for components therein without departing from the scope of the present application. In particular, as long as there is no structural conflict, various technical features mentioned in various embodiments may be combined in any manner. The present application is not limited to the specific embodiments disclosed herein, but includes all technical solutions falling within the scope of the claims.

What is claimed is:

1. A transmission system, comprising:
a gearbox, comprising a housing, an output shaft and a bearing, the output shaft being rotatably connected with the housing through the bearing; and
a generator, comprising a rotor, a stator and a packaging assembly, the stator being connected with the housing, the rotor being connected with the output shaft, and the packaging assembly comprising a cover, a first connecting member and a second connecting member, wherein the cover is located on the same side of both the output shaft and the rotor, is connected and fixed with the rotor through the first connecting member, and is connected and fixed with the output shaft through the second connecting member;
wherein the cover is insulated from both the first connecting member and the rotor, and the cover is insulated from both the second connecting member and the output shaft;
the first insulating member comprises a first insulating sleeve, a first inner insulating part and a first outer insulating part, the first connecting member comprises a first end cap, and the first outer insulating part is clamped between the first end cap and the cover; and
the packaging assembly further comprises a first force-equalizing ring, which is clamped between the first outer insulating part and the first end cap, and a central axis of the first force-equalizing ring coincides with a central axis of the transmission system.

2. The transmission according to claim 1, wherein the first connecting member is inserted into and connected with the cover and the rotor, and the cover is insulated from both the first connecting member and the rotor through the first insulating member.

3. The transmission system according to claim 2, wherein the cover and the rotor are insulated from each other through the first inner insulating part, and the first connecting member is insulated from the cover through both the first insulating sleeve and the first outer insulating part.

4. The transmission system according to claim 3, wherein the first connecting member comprises a first connecting rod, the first connecting rod is inserted into and connected with both the cover and the rotor and is threadedly connected with the rotor, the first end cap is disposed at one end of the first connecting rod away from the rotor, the first insulating sleeve is sleeved on the first connecting rod, and the first inner insulating part is clamped between the cover and the rotor.

5. The transmission system according to claim 3, wherein the first inner insulating part comprises a first inner insulating ring and a first inner positioning ring, the first inner insulating ring is clamped between the rotor and the cover, and the first inner positioning ring is inserted into and connected with the rotor.

6. The transmission system according to claim 1, wherein the packaging assembly further comprises a second insulating member, the second connecting member is inserted into and connected with both the cover and the output shaft, and the cover is insulated from both the second connecting member and the output shaft through the second insulating member.

7. The transmission system according to claim 6, wherein the second insulating member comprises a second insulating sleeve, a second inner insulating part, and a second outer insulating part, the cover is insulated from the output shaft through the second inner insulating part, and the second connecting member is insulated from the cover through both the second insulating sleeve and the second outer insulating part.

8. The transmission system according to claim 7, wherein the second connecting member comprises a second connecting rod and a second end cap, the second connecting rod is inserted into and connected with both the cover and the output shaft and is threadedly connected with the output shaft, the second end cap is disposed at one end of the second connecting rod away from the output shaft, the second insulating sleeve is sleeved on the second connecting rod, the second inner insulating part is clamped between the cover and the output shaft, and the second outer insulating part is clamped between the second end cap and the cover.

9. The transmission system according to claim 8, wherein the packaging assembly further includes a second force-equalizing ring, which is clamped between the second outer insulating part and the second end cap.

10. The transmission system according to claim 7, wherein the second inner insulating part comprises a second inner insulating ring and a second inner positioning ring, the second inner insulating ring is clamped between the rotor and the output shaft, and the second inner positioning ring is sleeved on one end of the output shaft.

11. The transmission system according to claim 1, wherein the gearbox further comprises a box cover, which is arranged at one end of the housing and clamped between the housing and the cover, one of the box cover and the packaging assembly is provided with a protrusion and the other is provided with a groove, and the protrusion extends into the groove and is matched with the groove in a dynamic sealing manner.

12. A wind turbine generator system, comprising a transmission system as claimed in claim 1.

* * * * *